US010733420B2

(12) United States Patent
Liu

(10) Patent No.: US 10,733,420 B2
(45) Date of Patent: Aug. 4, 2020

(54) SYSTEMS AND METHODS FOR FREE SPACE INFERENCE TO BREAK APART CLUSTERED OBJECTS IN VEHICLE PERCEPTION SYSTEMS

(71) Applicant: GM GLOBAL TECHNOLOGY OPERATIONS LLC, Detroit, MI (US)

(72) Inventor: Mark Liu, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 247 days.

(21) Appl. No.: 15/820,163

(22) Filed: Nov. 21, 2017

(65) Prior Publication Data

US 2018/0101720 A1  Apr. 12, 2018

(51) Int. Cl.
| | |
|---|---|
| G06K 9/00 | (2006.01) |
| G05D 1/02 | (2020.01) |
| G01S 17/42 | (2006.01) |
| G01S 7/48 | (2006.01) |
| G01S 17/89 | (2020.01) |
| G01S 17/931 | (2020.01) |

(52) U.S. Cl.
CPC ........ G06K 9/00208 (2013.01); G01S 7/4802 (2013.01); G01S 7/4808 (2013.01); G01S 17/42 (2013.01); G01S 17/89 (2013.01); G01S 17/931 (2020.01); G05D 1/0248 (2013.01); G06K 9/00791 (2013.01); G06K 9/00805 (2013.01)

(58) Field of Classification Search
CPC ...... G01S 17/89; G01S 13/931; G01S 17/936; G01S 19/48; G01S 13/86; G01S 13/865; G01S 17/023; G01S 19/39; G01S 19/43
See application file for complete search history.

(56) References Cited

U.S. PATENT DOCUMENTS

| | | | |
|---|---|---|---|
| 2008/0027591 A1* | 1/2008 | Lenser | G05D 1/0251 701/2 |
| 2010/0066587 A1* | 3/2010 | Yamauchi | G05D 1/0044 342/70 |
| 2017/0122741 A1* | 5/2017 | Sakai | G01S 19/48 |
| 2017/0124862 A1* | 5/2017 | Sakai | G01C 21/26 |
| 2017/0197615 A1* | 7/2017 | Elie | B60W 10/20 |
| 2017/0329008 A1* | 11/2017 | Walessa | G01S 15/931 |
| 2018/0074200 A1* | 3/2018 | Liu | G01S 17/58 |
| 2018/0095474 A1* | 4/2018 | Batur | G06K 9/4604 |
| 2018/0101720 A1* | 4/2018 | Liu | G06K 9/00208 |
| 2018/0144496 A1* | 5/2018 | Posner | G06K 9/00214 |
| 2018/0173827 A1* | 6/2018 | Boulkenafed | A63F 13/00 |

* cited by examiner

Primary Examiner — Redhwan K Mawari
(74) Attorney, Agent, or Firm — Lorenz & Kopf, LLP

(57) ABSTRACT

Systems and method are provided for identifying free space between objects. The method includes retrieving, by a processor, a voxel grid around the vehicle wherein the voxel grid has a plurality of columns. The method further includes tracing, by the processor, lidar beams from a lidar system on the vehicle through the voxel grid, identifying, by the processor, a max subarray for each column in the voxel grid, classifying, by the processor, each column with a free space level, and outputting, by the processor, the classified columns as an image.

20 Claims, 7 Drawing Sheets

SYSTEMS AND METHODS FOR FREE SPACE INFERENCE TO BREAK APART CLUSTERED OBJECTS IN VEHICLE PERCEPTION SYSTEMS

TECHNICAL FIELD

The present disclosure generally relates to vehicle perception systems, and more particularly relates to systems and methods for distinguishing between clustered objects in vehicle perception systems.

BACKGROUND

Vehicle perception systems have been introduced into vehicles to allow a vehicle to sense its environment and in some cases to allow the vehicle to navigate autonomously or semi-autonomously. Sensing devices that may be employed in vehicle perception systems include radar, lidar, image sensors, and others.

While recent years have seen significant advancements in vehicle perception systems, such systems might still be improved in a number of respects. For example, lidar may be used to detect objects near a vehicle. It may, however, be difficult from lidar data to distinguish between multiple objects that are in close proximity to each other. Multiple objects in close proximity to each other may appear as a single object from lidar data.

Accordingly, it is desirable to provide systems and methods for separating clustered objects in lidar data so that multiple objects that are in close proximity to each other may be distinguished. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for distinguishing between clustered objects in vehicle perception systems. In one embodiment, provided is a processor-implemented method in a vehicle for identifying free space between objects. The method includes retrieving, by a processor, a voxel grid around the vehicle wherein the voxel grid has a plurality of columns. The method further includes tracing, by the processor, lidar beams from a lidar system on the vehicle through the voxel grid, identifying, by the processor, a max subarray for each column in the voxel grid, classifying, by the processor, each column with a free space level, and outputting, by the processor, the classified columns as an image.

In one embodiment, retrieving a voxel grid includes retrieving lidar point cloud data, retrieving lidar position information relative to the vehicle, and retrieving vehicle position information.

In one embodiment, retrieving a voxel grid further includes shifting a pre-existing voxel grid based on the lidar point cloud data, the lidar position information and the vehicle position information.

In one embodiment, tracing lidar beams through the voxel grid includes assigning a first characteristic to a voxel if one of the lidar beams travels through the voxel, assigning a second characteristic to a voxel if none of the lidar beams travels through the voxel, and assigning a third characteristic to a voxel if one of the lidar beams terminates at the voxel.

In one embodiment, the first characteristic is clear, the second characteristic is unknown, and the third characteristic is occupied.

In one embodiment, identifying a max subarray for each column in the voxel grid includes assigning a score to each voxel.

In one embodiment, assigning a score for each voxel includes assigning a first value to a voxel if a first characteristic has been assigned to the voxel, assigning a second value to a voxel if a second characteristic has been assigned to the voxel, and assigning a third value to a voxel if a third characteristic has been assigned to the voxel.

In one embodiment, the first value is greater than the second and third values and the second value is greater than the third value.

In one embodiment, identifying a max subarray for each column in the voxel grid further includes identifying a sequence of contiguous elements that maximizes the score for the column, identifying a subarray length for the identified sequence of contiguous elements, and identifying an elevation of the lowest cell in the identified sequence of contiguous elements.

In one embodiment, classifying each column with a free space level includes determining, for each column, a free space level classification from a heuristic lookup table based on the subarray length and the elevation of the lowest cell in the identified max subarray for the column.

In one embodiment, a column with the highest free space level classification indicates free space between objects in the image.

In one embodiment, a column with the lowest free space level classification indicates no free space between objects in the image.

In another embodiment, provided is a system in a vehicle for generating from lidar data a two-dimensional map that identifies free space between objects. The system includes a voxel grid adjustment module including one or more processors configured by programming instructions encoded in non-transient computer readable media wherein the voxel grid adjustment module is configured to generate a voxel grid around the vehicle wherein the voxel grid has a plurality of columns. The system further includes a lidar beam tracing module including one or more processors configured by programming instructions encoded in non-transient computer readable media wherein the lidar beam tracing module is configured to trace lidar beams from a lidar system on the vehicle through the voxel grid, a max subarray module including one or more processors configured by programming instructions encoded in non-transient computer readable media wherein the max subarray module is configured to identify a max subarray for each column in the voxel grid, and a free space level classification module including one or more processors configured by programming instructions encoded in non-transient computer readable media wherein the free space level classification module is configured to classify each column according to a free space level. The system is configured to output the classified columns as an image.

In one embodiment, the lidar beam tracing module is configured to generate a voxel grid using lidar point cloud data, lidar position information relative to the vehicle, and vehicle position information.

In one embodiment, the lidar beam tracing module is configured to trace lidar beams through the voxel grid by characterizing a voxel as clear if one of the lidar beams travels through the voxel, characterizing a voxel as unknown if none of the lidar beams travels through voxel, and characterizing a voxel as occupied if one of the lidar beams terminates at the voxel.

In one embodiment, the max subarray module is configured to identify a max subarray for each column in the voxel grid by assigning a score to each voxel wherein assigning a score includes assigning a first value to a voxel if one of the lidar beams travels through the voxel, assigning a second value to a voxel if none of the lidar beams travels through voxel, and assigning a third value to a voxel if one of the lidar beams terminates at the voxel.

In one embodiment, the max subarray module is further configured to identify a max subarray for each column in the voxel grid by identifying a sequence of contiguous elements that maximizes the score for the column, identifying a subarray length for the identified sequence of contiguous elements, and identifying an elevation of the lowest cell in the identified sequence of contiguous elements.

In one embodiment, the free space level classification module is configured to classify each column with a free space level by determining, for each column, a free space level from a heuristic lookup table based on the subarray length and the elevation of the lowest cell in the identified max subarray for the column.

In another embodiment, an autonomous vehicle includes a lidar system that generates lidar data and a mapping system that is configured to generate from the lidar data a two-dimensional image that identifies free space between objects. The mapping system includes one or more processors configured by programming instructions encoded in non-transient computer readable media. The mapping system is configured to retrieve a voxel grid around the vehicle wherein the voxel grid has a plurality of columns. The mapping system is further configured to trace lidar beams from the lidar system through the voxel grid, identify a max subarray for each column in the voxel grid, classify each column with a free space level, and output the classified columns as the image.

In one embodiment, the mapping system is configured to identify a max subarray for each column in the voxel grid by scoring each voxel, identifying a sequence of contiguous elements that maximizes the score for the column, identifying a subarray length for the identified sequence of contiguous elements and identifying an elevation of the lowest cell in the identified sequence of contiguous elements.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1A:
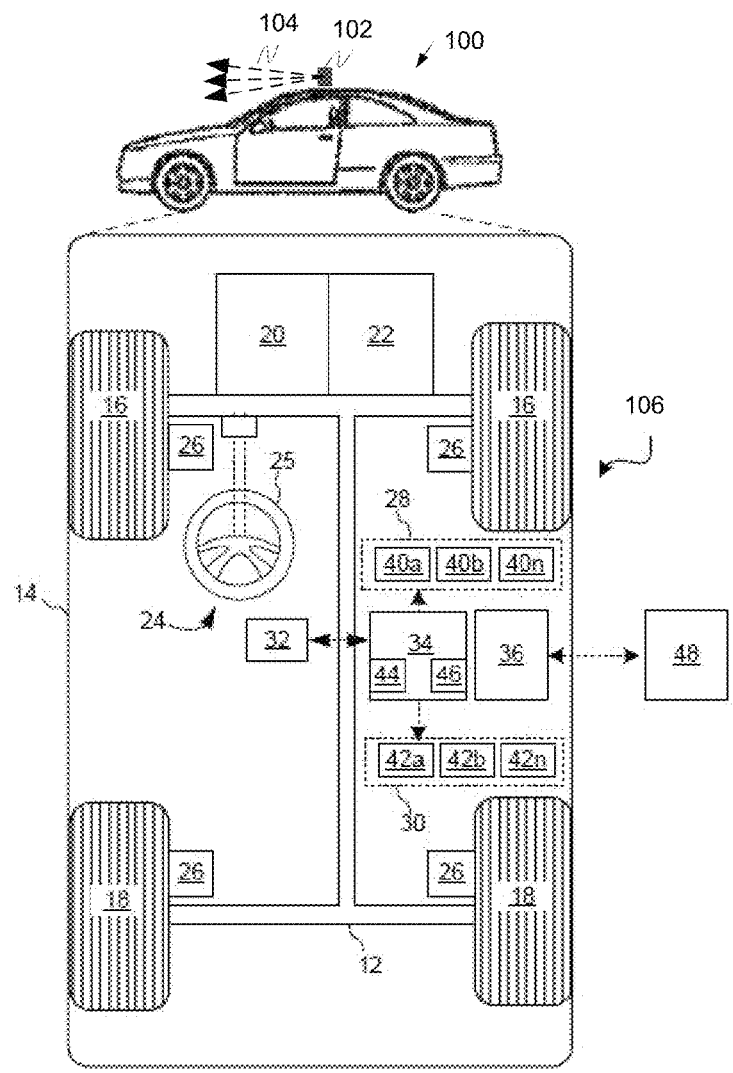
FIG. 1A depicts an example vehicle that includes a lidar (light detection and ranging) system, in accordance with various embodiments.
Figure 1B:
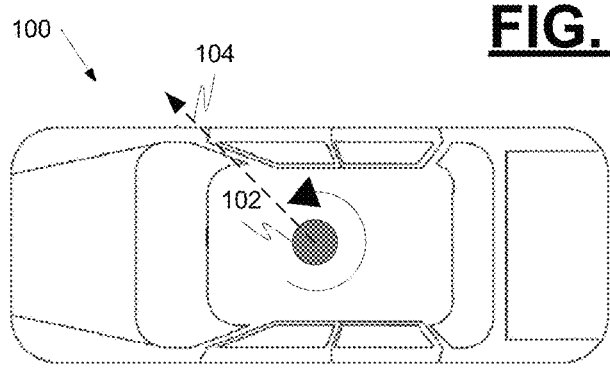
FIG. 1B presents a top down view of the example vehicle of FIG. 1A that illustrates the lidar system, in accordance with various embodiments.

FIGS. 1A and 1B depict an example vehicle 100 that includes a lidar (light detection and ranging) system 102. FIG. 1A presents a side view of the example vehicle 100 and FIG. 1B presents a top down view of the example vehicle 100. The example lidar system 102 is mounted onto a surface (e.g., a top surface) of the example vehicle 100. The example lidar system 102 includes a sensor that rotates (e.g., in a counter-clockwise direction) and emits a plurality of light beams 104. The example lidar system 102 measures an amount of time for the light beams to return to the vehicle 100 to measure the distance of objects surrounding the vehicle 100. The example vehicle 100 includes a mapping system 106 that is configured to provide a two-dimensional, top down view of an area surrounding the vehicle that has been processed to highlight free space between objects in the view.

Figure 1C:
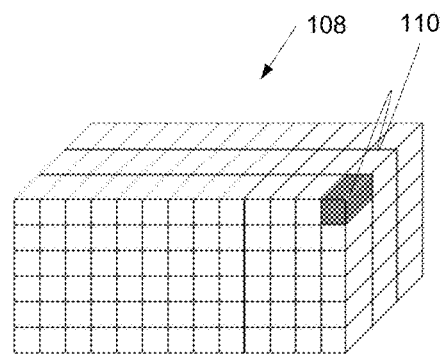
FIG. 1C depicts an example voxel grid that may be visualized as being formed around the example vehicle of FIG. 1A in a computerized three-dimensional representation of the space surrounding the example vehicle, in accordance with various embodiments.

FIG. 1C depicts an example voxel grid 108 that may be visualized as being formed around the example vehicle 100 in a computerized three-dimensional representation of the space surrounding the example vehicle 100. The example voxel grid 108 is made up of a plurality of voxels 110 (with a single voxel shaded in this example). Each voxel 110 in the example voxel grid 108 may be characterized as being in one of three states: a clear state, an occupied state, or an unknown state. The voxel state is determined, in this example, based on whether a lidar beam 104 from the example vehicle 100 has entered or passed through the voxel 110. A voxel is considered to be in a clear state if from the lidar data it can be determined that a lidar beam would pass through the voxel before encountering an object. A voxel is considered to be in an occupied state if from the lidar data it can be determined that an object would be present at that voxel. A voxel is considered to be in an unknown state if the state of the voxel cannot be determined from the lidar data. Multiple contiguous voxels can be indicative of a single object or one or more clustered objects. The mapping system 106 is configured to indicate whether multiple contiguous voxels are indicative of a single object or one or more clustered objects.

As depicted in FIG. 1A, the vehicle 100 generally includes a chassis 12, a body 14, front wheels 16, and rear wheels 18. The body 14 is arranged on the chassis 12 and substantially encloses components of the vehicle 100. The body 14 and the chassis 12 may jointly form a frame. The wheels 16-18 are each rotationally coupled to the chassis 12 near a respective corner of the body 14.

In various embodiments, the vehicle 100 is an autonomous vehicle and the mapping system 106 is incorporated into the autonomous vehicle 100. The autonomous vehicle 100 is, for example, a vehicle that is automatically controlled to carry passengers from one location to another. The vehicle 100 is depicted in the illustrated embodiment as a passenger car, but other vehicle types, including motorcycles, trucks, sport utility vehicles (SUVs), recreational vehicles (RVs), marine vessels, aircraft, etc., may also be used.

In an exemplary embodiment, the autonomous vehicle 100 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any vehicle in which the present subject matter may be implemented, regardless of its level of autonomy.

As shown, the autonomous vehicle 100 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 100 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 100 may also include interior and/or exterior vehicle features not illustrated in FIG. 1A, such as various doors, a trunk, and cabin features such as air, music, lighting, touchscreen display components (such as those used in connection with navigation systems), and the like.

The data storage device 32 stores data for use in automatically controlling the vehicle 100. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 100 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 100. In various embodiments, controller 34 is configured to implement a mapping system as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the autonomous vehicle 10, and generate control signals that are transmitted to the actuator system 30 to automatically control the components of the autonomous vehicle 100 based on the logic, calculations, methods, and/or algorithms. Although only one controller 34 is shown in FIG. 1A, embodiments of the autonomous vehicle 100 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 100.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
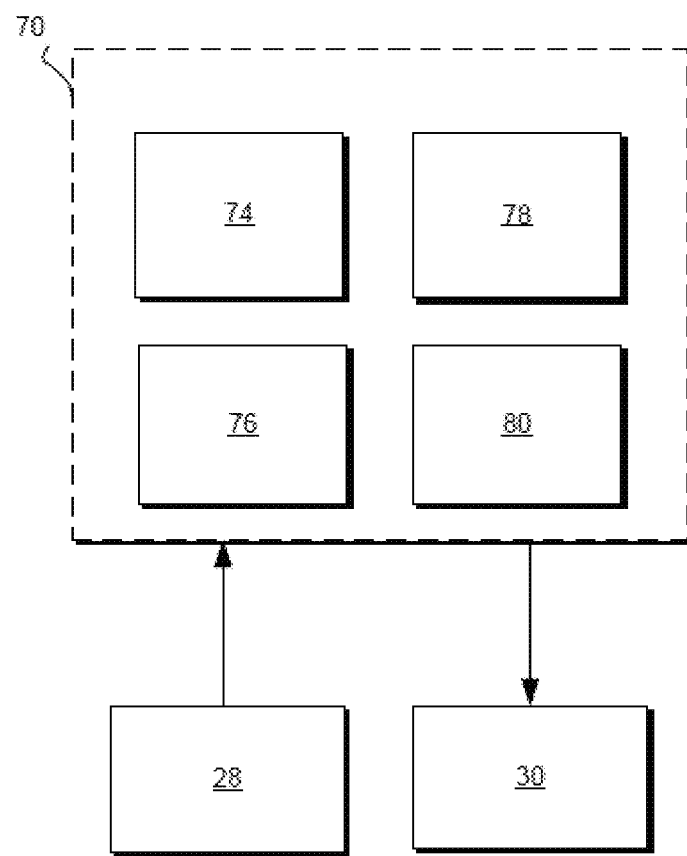
FIG. 2 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 2. That is, suitable software and/or hardware components of controller 34 (e.g., processor 44 and computer-readable storage device 46) are utilized to provide an autonomous driving system 70 that is used in conjunction with vehicle 100.

In various embodiments, the instructions of the autonomous driving system 70 may be organized by function or system. For example, as shown in FIG. 2, the autonomous driving system 70 can include a perception system 74, a positioning system 76, a path planning system 78, and a vehicle control system 80. As can be appreciated, in various embodiments, the instructions may be organized into any number of systems (e.g., combined, further partitioned, etc.) as the disclosure is not limited to the present examples.

In various embodiments, the perception system 74 synthesizes and processes the acquired sensor data and predicts the presence, location, classification, and/or path of objects and features of the environment of the vehicle 100. In various embodiments, the perception system 74 can incorporate information from multiple sensors (e.g., sensor system 28), including but not limited to cameras, lidars, radars, and/or any number of other types of sensors.

The positioning system 76 processes sensor data along with other data to determine a position (e.g., a local position relative to a map, an exact position relative to a lane of a road, a vehicle heading, etc.) of the vehicle 100 relative to the environment. As can be appreciated, a variety of techniques may be employed to accomplish this localization, including, for example, simultaneous localization and mapping (SLAM), particle filters, Kalman filters, Bayesian filters, and the like.

The path planning system 78 processes sensor data along with other data to determine a path for the vehicle 100 to follow. The vehicle control system 80 generates control signals for controlling the vehicle 100 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, all or parts of the mapping system 106 may be included within the perception system 74, the positioning system 76, the path planning system 78, and/or the vehicle control system 80. As mentioned briefly above, the mapping system 106 of FIG. 1A is configured to process lidar data in a way that highlights free space between objects to provide a two-dimensional top down view of an area surrounding the vehicle.

Figure 3:
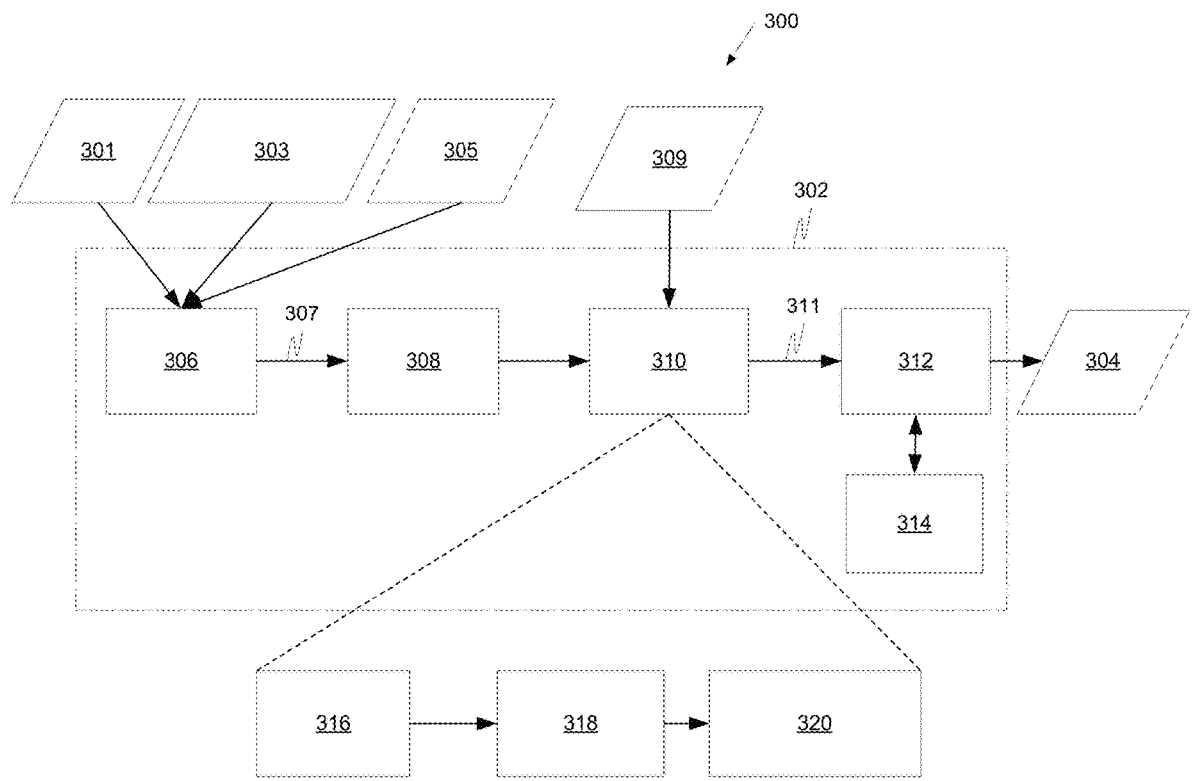
FIG. 3 is a block diagram of an example mapping system in an example vehicle, in accordance with various embodiments.

FIG. 3 is a block diagram of an example mapping system 302 in an example vehicle 300. The example mapping system 302 is configured to generate from lidar data a two-dimensional image 304 of an area surrounding the vehicle 300 that identifies free space between objects in the image 304. To generate the image 304, the example mapping system 302 is configured to retrieve a voxel grid around a vehicle for the current instance in time wherein the voxel grid has a plurality of columns, trace lidar beams from the lidar system through the voxel grid, identify a max subarray for each column in the voxel grid, classify each column with a free space level, and output the classified columns as the image. The example mapping system 302 includes a voxel grid adjustment module 306, a lidar beam tracing module 308, a max subarray module 310, a free space classification module 312, and a heuristic lookup table (LUT) 314.

The mapping system includes a controller that is configured to implement the voxel grid adjustment module 306, lidar beam tracing module 308, max subarray module 310, free space classification module 312, and LUT 314. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example voxel grid adjustment module 306 is configured to generate a voxel grid 307 around a vehicle for the current instance in time wherein the voxel grid 307 has a plurality of columns. The example voxel grid adjustment module 306 is configured to retrieve a pre-existing voxel grid (or construct one) and retrieve lidar point cloud data 301, lidar position information 303 relative to the vehicle, and vehicle position information 305 from other vehicle systems. Using the retrieved voxel grid, lidar point cloud data 301, lidar position information 303, and vehicle position information 305, the example voxel grid adjustment module 306 is configured to adjust/generate the voxel grid 307 for the current instance in time.

The example lidar beam tracing module 308 is configured to trace lidar beams from a lidar system on the vehicle through the voxel grid 307. The example lidar beam tracing module is configured to trace lidar beams through the voxel grid 307 by characterizing a voxel as clear if a lidar beam travels through the voxel, characterizing a voxel as unknown if no lidar beam travels through voxel, and characterizing a voxel as occupied if a lidar beam terminates at that voxel. The example lidar beam tracing module 308 is configured to trace lidar beams using the lidar point cloud data 301, lidar position information 303 relative to the vehicle, and vehicle position information 305 from other vehicle systems.

Figure 4A:
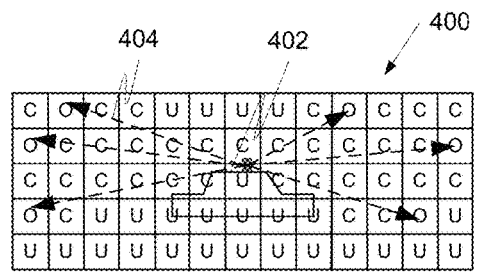
FIG. 4A depicts a side view of an example voxel grid after lidar beam tracing operations, in accordance with various embodiments.

FIG. 4A depicts a side view of an example voxel grid 400 after lidar beam tracing operations. The example voxel grid 400 includes a plurality of voxels that are characterized by one of three states: a clear state (C), an occupied state (O), or an unknown state (U). A voxel is characterized as clear if a lidar beam travels through the voxel, characterized as unknown if no lidar beam travels through voxel, or characterized as occupied if a lidar beam terminates at that voxel. Also, overlaid onto the voxel grid 400 for illustrative purposes is an example vehicle 402 and example lidar beams 404.

Referring back to FIG. 3, the example max subarray module 310 is configured to identify a max subarray for each column in the voxel grid. The example max subarray module 310 is configured to identify a max subarray 311 for each column in the voxel grid by assigning a score to each voxel. Assigning a score may include assigning a first value (e.g., 10) to a voxel if a lidar beam travels through the voxel, assigning a second value (e.g., −50) to a voxel if a lidar beam terminates at that voxel, and assigning a third value (e.g., −2) to a voxel if no lidar beam travels through voxel. The example max subarray module 310 is further configured to identify a max subarray 311 for each column in the voxel grid by identifying a sequence of contiguous elements that maximizes the score for the column, identifying a subarray length for the identified sequence of contiguous elements, and identifying an elevation of the lowest cell (i.e., the cell having the lowest elevation) in the identified sequence of contiguous elements. Identification of an elevation of the lowest cell can be made with use of a ground height map 309.

Figure 4B:
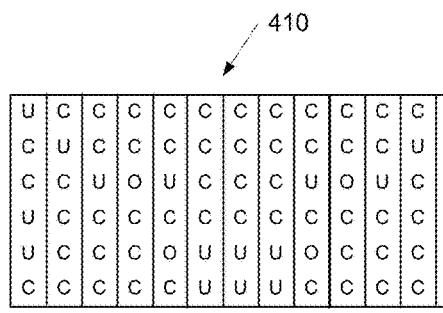
FIG. 4B depicts a side view of another example voxel grid after lidar beam tracing operations, in accordance with various embodiments.

FIG. 4B depicts a side view of an example voxel grid 410 after lidar beam tracing operations. The example voxel grid 410 includes a plurality of voxels that are characterized by one of three states: a clear state (C), an occupied state (O), or an unknown state (U). In this example, a voxel is characterized as clear if a lidar beam travels through the voxel, characterized as unknown if no lidar beam travels through voxel, or characterized as occupied if a lidar beam terminates at that voxel. The example voxel grid 410 is grouped by columns.

Figure 4C:
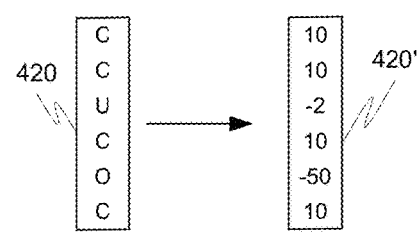
FIG. 4C illustrates the conversion of voxel states in a voxel column to scores, in accordance with various embodiments.

FIG. 4C illustrates the conversion of voxel states in a voxel column to scores. In particular, FIG. 4C depicts an example column 420 from a voxel grid having six voxels that are characterized by one of three states—clear (C), occupied (O), or unknown (U)—and an example column 420' wherein the voxel states have been converted to scores. In this example, voxels in a "C" state are assigned a score of 10, voxels in an "O" state are assigned a score of −50, and voxels in an "U" state are assigned a score of −2.

Figure 4D:
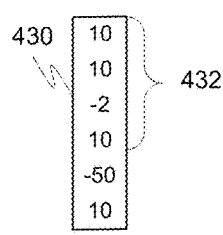
FIG. 4D illustrates the determination of the max subarray in an example column, in accordance with various embodiments.

FIG. 4D illustrates the determination of the max subarray 432 in an example column 430. In this example, the max subarray 432 is determined by identifying the sequence of contiguous voxels in the column 430 having the maximum total score when the individual voxel scores in the sequence are added together. In this example, the total score of the sequence of four voxels at the top of the column 430 have the maximum score for any sequence of voxels in the column 430. In this example, the total score for the sequence of voxels having the maximum score is equal to 28 (10+ 10−2+10=28). No other contiguous sequence of voxels has a total score when added together that is higher.

Figure 4E:
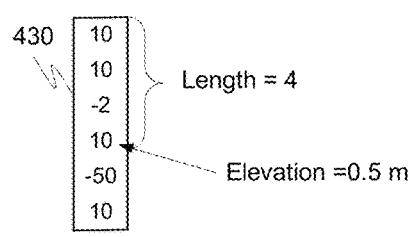
FIG. 4E illustrates the determination of the length and elevation of the lowest element of a max subarray in an example column, in accordance with various embodiments.

The length of the max subarray is equal to the number of elements in the subarray and the elevation of the subarray is equal to the elevation above ground of the lowest cell in the max subarray. As illustrated in the example of FIG. 4E, the length is equal to 4 and the elevation is equal to 0.5 meters because the elevation of the $4^{th}$ voxel from the top in the column is equal to 0.5 meters.

Referring back to FIG. 3, the example max subarray module 310 includes a column scoring module 316, an identification (ID) module 318 for identifying the max subarray in a column, and an ID module 320 for identifying the subarray length and elevation for the max subarray in a column. The example column scoring module 316 is configured to identify a max subarray for each column in the voxel grid by assigning a score to each voxel. The example ID module 318 is configured to identify the max subarray by identifying a sequence of contiguous elements in a column that maximize the score for the column. The example ID module 320 is configured to identify a subarray length for the identified sequence of contiguous elements and identify an elevation of the lowest cell in the identified sequence of contiguous elements using data from the ground height map 309.

The example free space level classification module is configured to classify each column according to a free space level. The example free space level classification module is configured to classify each column with a free space level by determining, for each column, a free space level from the heuristic LUT 314. The subarray length and the elevation for the max subarray in a column are input to the heuristic LUT 314, which classifies the column with a free space level. The free space levels in this example includes four levels: a highly free level, a medium free level, a low free level, and a very low free level. The free space levels may be indicative of the likelihood of an object in the column with a highly free level being indicative of a higher likelihood of no object is in the column and a very low free level being indicative of a higher likelihood that an object exists in the column.

The example LUT 314 may include the following constants (with units in meters):
HIGH_FREE_SPACE___MIN_CLEAR_COLUMN_LENGTH=1.0
HIGH_FREE_SPACE___MAX_CLEAR_COLUMN_ELEVATION=0.5;
MEDIUM_FREE_SPACE___MIN_CLEAR_COLUMN_LENGTH=0.5;
MEDIUM_FREE_SPACE___MAX_CLEAR_COLUMN_ELEVATION=1.0;
LOW_FREE_SPACE___MIN_CLEAR_COLUMN_LENGTH=0.25;
LOW_FREE_SPACE___MAX_CLEAR_COLUMN_ELEVATION=1.5;
VERY_LOW_FREE_SPACE___MIN_CLEAR_COLUMN_LENGTH=0.25: and
VERY_LOW_FREE_SPACE___MAX_CLEAR_COLUMN_ELEVATION=2.0.

The example LUT 314 may classify the columns in accordance with the following:
If ((elevation<HIGH_FREE_SPACE___MAX_CLEAR_COLUMN_ELEVATION) AND (length>HIGH_FREE_SPACE___MIN_CLEAR_COLUMN_LENGTH)) THEN free_space_output=FREE_SPACE_OUTPUT___HIGHLY_FREE.
If ((elevation<MEDIUM_FREE_SPACE___MAX_CLEAR_COLUMN_ELEVATION) AND (length>MEDIUM_FREE_SPACE___MIN_CLEAR_COLUMN_LENGTH)) THEN free_space_output=FREE_SPACE_OUTPUT___MEDIUM_FREE.
If ((elevation<LOW_FREE_SPACE___MAX_CLEAR_COLUMN_ELEVATION) AND (length>LOW_FREE_SPACE___MIN_CLEAR_COLUMN_LENGTH)) THEN free_space_output=FREE_ SPACE_OUTPUT___LOW_FREE
If ((elevation VERY_LOW_FREE_SPACE___MAX_CLEAR_COLUMN_ELEVATION) AND (length>VERY_LOW_FREE_SPACE___MIN_CLEAR_COLUMN_LENGTH)) THEN free_space_output=FREE_SPACE_OUTPUT___VERY_LOW_FREE.
If none of the foregoing conditions are met. THEN free_space_output=FREE_SPACE_OUTPUT___UNKNOWN.

As an example, if the example max subarray module 310 has found a max subarray that is 10 meters long that starts 0.1 meters above the ground, the column will be classified as "highly free." In this example, the first "if" statement is executed because the elevation=0.1<HIGH_FREE_SPACE___MAX_CLEAR_COLUMN_ELEVATION=0.5 and length=10>HIGH_FREE_SPACE___MIN_CLEAR_COLUMN_LENGTH=1.0.

As an example, if the example max subarray module 310 has found a max subarray that is 10 meters long that starts 0.1 meters above the ground, the column will be classified as "highly free." In this example, the first "if" statement is executed because the elevation=0.1<HIGH_FREE_SPACE___MAX_CLEAR_COLUMN_ELEVATION=0.5 and length=10>HIGH_FREE_SPACE___MIN_CLEAR_COLUMN_LENGTH=1.0.

In another example, the example max subarray module 310 has found a max subarray that is 10.0 meters long and starts 5.0 meters above the ground. Although the length of the max subarray may hint at free space, the max subarray beginning at such a height above the ground may suggest that there may be something (e.g., a car hood or some other blockage) that prevents the max subarray from starting closer to the ground. In this case, none of the "if" statements are executed because the elevation is too high. The max subarray is marked as FREE_SPACE_OUTPUT___UNKNOWN in this example.

The example mapping system 302 is further configured to output the classified columns as the image 304. The columns classified in the free space levels may be displayed as a top down view of the area surrounding a vehicle. The columns with a highly free level may indicate space between objects in the image.

The example mapping system 302 is further configured to output the classified columns as the image 304. The columns classified in the free space levels may be displayed as a top down view of the area surrounding a vehicle. The columns with a highly free level may indicate space between objects in the image.

Figure 5:
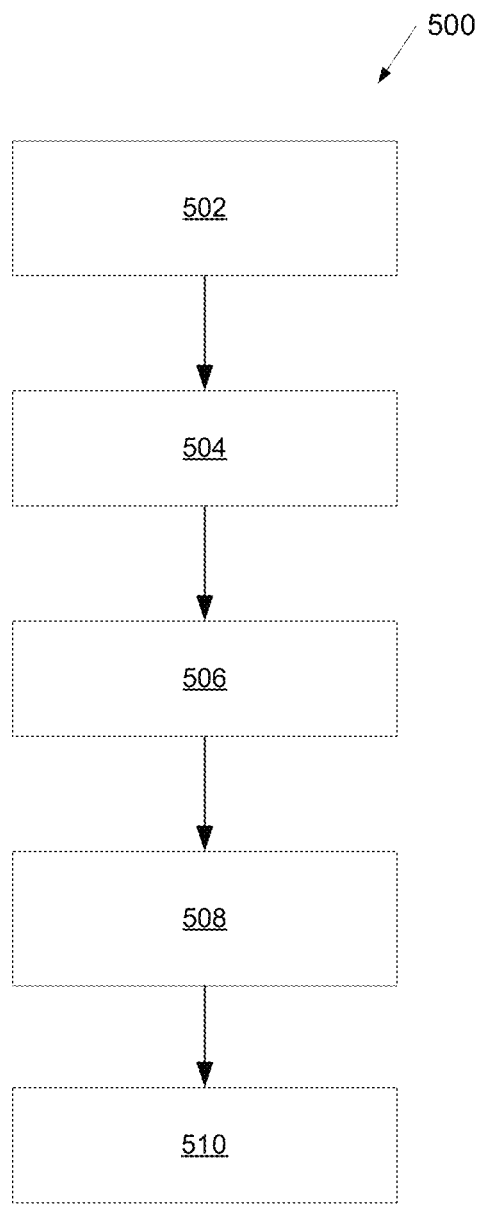
FIG. 5 is a process flow chart depicting an example process in a vehicle for generating a top down, two-dimensional (2D) image from lidar data for identifying free space between objects, in accordance with various embodiments.

FIG. 5 is a process flow chart depicting an example process 500 in a vehicle for generating a top down, two-dimensional (2D) image from lidar data for identifying free space between objects. The example process 500 includes retrieving a voxel grid around a vehicle for the current instance in time wherein the voxel grid has a plurality of columns (operation 502). Retrieving a voxel grid may include retrieving a pre-existing voxel grid (or constructing one) and retrieving lidar point cloud data, lidar position information relative to the vehicle, and vehicle position information from other vehicle systems. Retrieving a voxel grid may further include shifting (e.g., adding columns of voxels to a voxel grid in the direction of vehicle movement) the voxel grid based on the lidar point cloud data, lidar position information and vehicle position information for a current instance in time. The voxel grid may be shifted by both adding voxels to a front face of a voxel grid for a prior time instance wherein the number of voxels added corresponds to the amount of vehicle movement in the front face direction over the time increment and removing voxels from a rear face of the voxel grid for the prior time instance wherein the number of voxels removed corresponds to the amount of vehicle movement in the direction opposite to the rear face direction over the time increment The example process 500 includes tracing lidar beams from a lidar system on the vehicle through the voxel grid (operation 504). Tracing lidar beams through the voxel grid may include assigning one of three characteristics to each voxel such as characterizing a voxel as clear if a lidar beam travels through the voxel, characterizing a voxel as unknown if no lidar beam travels through voxel, and characterizing a voxel as occupied if a lidar beam terminates at that voxel. Lidar point cloud data, lidar position information relative to the vehicle, and vehicle position information from other vehicle systems may be used in the lidar beam tracing operations.

The example process 500 includes identifying a max subarray for each column in the voxel grid (operation 506). Identifying a max subarray for each column in the voxel grid may include assigning a score to each voxel wherein the score may comprise one of three different values based on a characteristic assigned to the voxel. As an example, a value of 10 may be assigned to a voxel if a lidar beam travels through the voxel, a value of −50 may be assigned to a voxel if no lidar beam travels through voxel, and a value of −2 may be assigned to a voxel if a lidar beam terminates at that voxel. Identifying a max subarray for each column in the voxel grid may further include identifying a sequence of contiguous elements that maximize the score for the column, identifying a subarray length for the identified sequence of contiguous elements, and identifying an elevation of the lowest cell in the identified sequence of contiguous elements.

The example process 500 includes classifying each column with a free space level (operation 508). Classifying each column with a free space level may include determining, for each column, a free space level by inputting to a heuristic lookup table the length of the max subarray and the elevation of the lowest cell in the max subarray for the column and receiving as an output a free space level. The free space level in this example may be one of four levels: a highly free level, a medium free level, a low free level, and a very low free level.

The example process 500 includes outputting the classified columns as an image (operation 510). The classified columns can be used to generate a top down view of the area surrounding the vehicle. The columns with a highly free level may indicate space between objects in the image.

Figure 6:
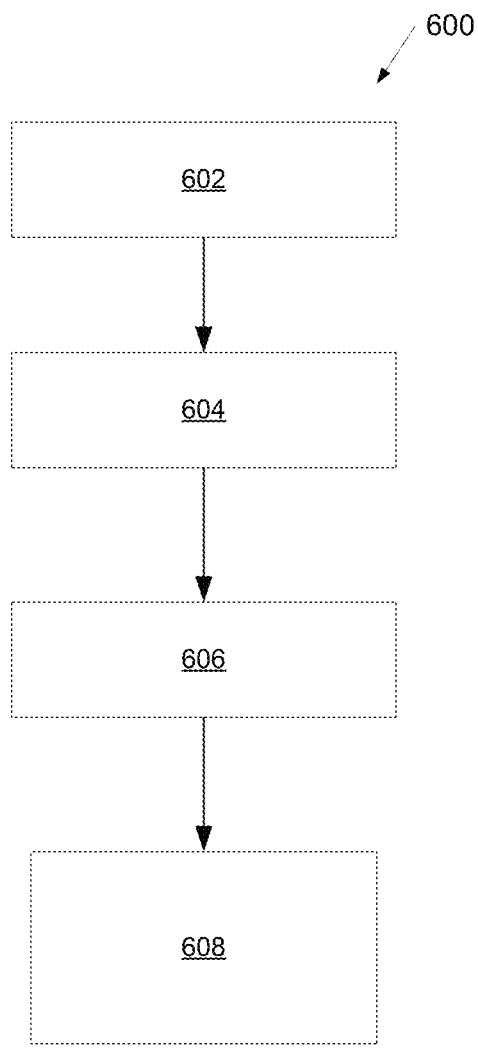
FIG. 6 is a process flow chart depicting an example process in a vehicle for classifying columns in a voxel grid by a free space level, in accordance with various embodiments.

FIG. 6 is a process flow chart depicting an example process 600 in a vehicle for classifying columns in a voxel grid by a free space level. After ray tracing of lidar beams in a voxel grid, the example process includes assigning a score to each voxel (operation 602). As an example, voxels in a first state (e.g. "C" state) may be assigned a score of 10, voxels in a second state (e.g., an "O" state) may be assigned a score of −50, and voxels in a third state (e.g., a "U" state) may be assigned a score of −2.

The example process 600 includes finding a max subarray in each column (operation 604). For each column, the sequence of contiguous elements that maximizes the score for the column is identified.

The example process 600 includes identifying the length of the max subarray and the elevation of the max subarray (operation 606). The length in this example is equal to the number of elements in the max subarray. The elevation, in this example, is the ground height of the voxel containing the last element in the sequence of contiguous elements in the max subarray.

The example process 600 also includes classifying each column according to the degree of free space in the column by applying a heuristic lookup table (operation 608). In this example, the inputs to the heuristic lookup table include the length and elevation of the max subarray. The output includes the degree of free space for a column. In this example, one of four levels is output: a highly free, a medium free, a low free, and a very low free level. The classified columns can be used to generate a top down view of the area surrounding the vehicle. The columns with a highly free level may indicate free space between objects in the image.

Figure 7:
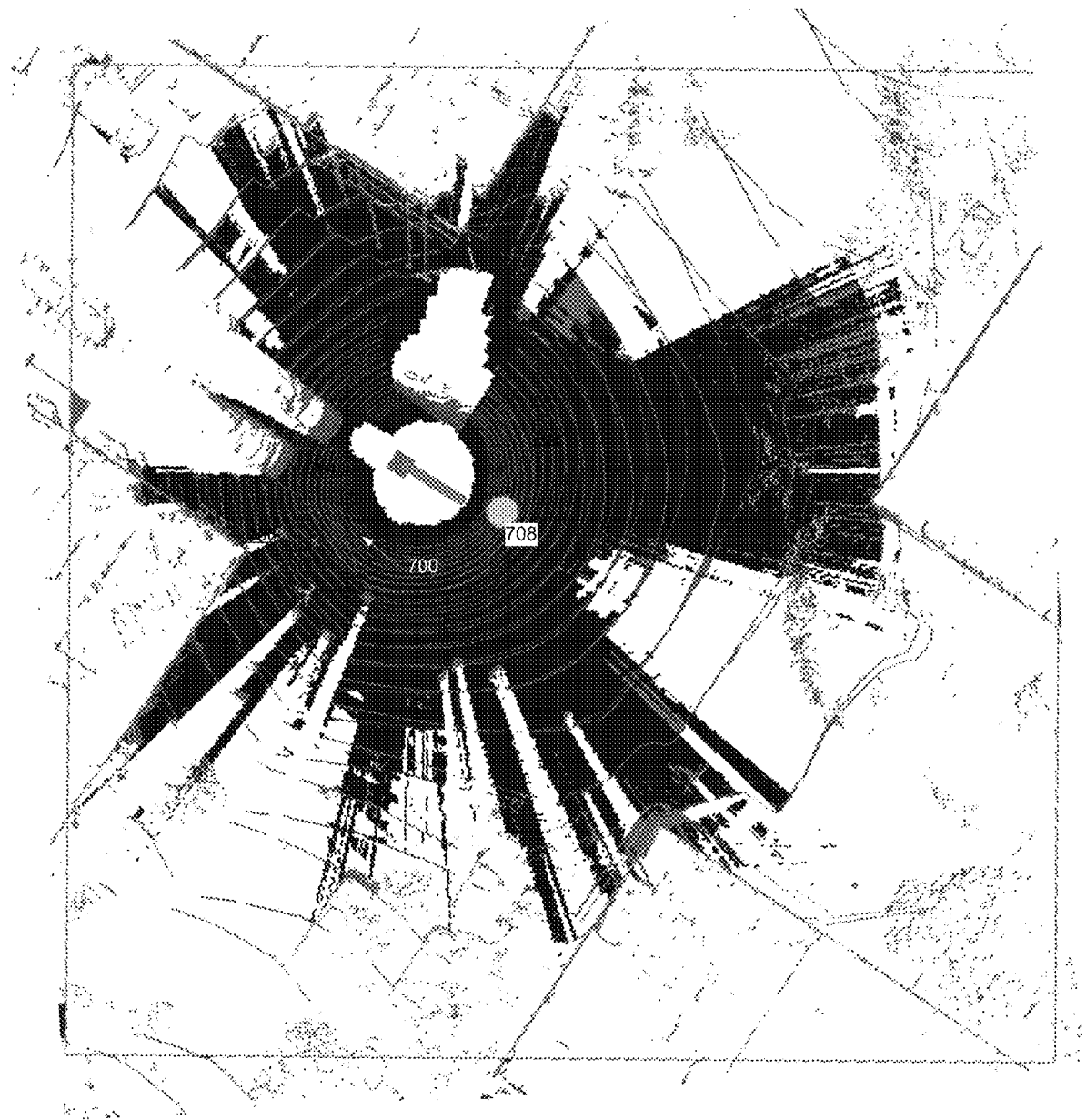
FIG. 7 is an example top down, two-dimensional (2D) image generated from lidar data that identifies free space between objects, in accordance with various embodiments.

FIG. 7 is an example top down, two-dimensional (2D) image generated from lidar data that identifies free space between objects. Illustrated is a lidar sensor 708 on a first vehicle. The example image shows a partial outline of a first object 702 to the left of the first vehicle, a partial outline of a second object (e.g., a second vehicle) 704 in front of the first vehicle, and a partial outline of a third object (e.g., a third vehicle) 706 to the left of the second object 704. Shown between the second object 704 and the third object 706 is a jut 700 of black space that illustrates free space between the second object 704 and the third object 706. The jut 700 of free space is valuable in assessing that the two vehicles 704, 706 are separate entities. Without the jut 700, a computer algorithm would likely treat the two vehicles 704, 706 as a single large object because their points are very close to each other. Use of an example mapping system allows for the distinguishing of the second object 704 from the third object 706 in the example image by highlighting the jut 700 of the free space between the objects.

The 2D image generated from the techniques described herein can be used to detect mistaken objects and tracking errors. If a perception system in a vehicle, such as perception system 74, tracks an object using, for example, an incorrect velocity, the vehicle's perception of the location of the tracked object could diverge from the actual location of the real-world object. As an example, a vehicle's erroneous perception of the location of a tracked object could place the object in a highly free area. The 2D image generated from the techniques described herein could show that the tracked object is actually in a free space area and therefore a tracking mistake occurred.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A processor-implemented method in a vehicle for identifying free space between objects, the method comprising:
retrieving, by a processor, a voxel grid around the vehicle, the voxel grid having a plurality of columns;
tracing, by the processor, lidar beams from a lidar system on the vehicle through the voxel grid;
identifying, by the processor, a max subarray for each column in the voxel grid, the identifying comprising:
assigning, for each column, a score to each voxel in the column by assigning a first value to a voxel if a first characteristic has been assigned to the voxel, assigning a second value to a voxel if a second characteristic has been assigned to the voxel, and assigning a third value to a voxel if a third characteristic has been assigned to the voxel; and
identifying, for each column, a sequence of contiguous elements in the column that maximizes a score for the column wherein the score for the column is equal to the sum of the scores assigned to the voxels in the identified sequence of contiguous elements;
identifying, by the processor for each column, a subarray length for the identified sequence of contiguous elements for the column;
identifying, by the processor for each column, an elevation of the lowest cell in the identified sequence of contiguous elements for the column;
classifying, by the processor, each column with a free space level based on the identified subarray length for the column and the identified elevation for the column; and
outputting, by the processor, the free space level for the classified columns in an image.

2. The method of claim 1, wherein retrieving a voxel grid comprises:
retrieving lidar point cloud data;
retrieving lidar position information relative to the vehicle; and
retrieving vehicle position information.

3. The method of claim 2, wherein retrieving a voxel grid further comprises shifting a pre-existing voxel grid based on the lidar point cloud data, the lidar position information and the vehicle position information.

4. The method of claim 1, wherein tracing lidar beams through the voxel grid comprises:
assigning the first characteristic to a voxel if one of the lidar beams travels through the voxel;
assigning the second characteristic to a voxel if none of the lidar beams travels through the voxel; and
assigning the third characteristic to a voxel if one of the lidar beams terminates at that voxel.

5. The method of claim 4, wherein the first characteristic is clear, the second characteristic is unknown, and the third characteristic is occupied.

6. The method of claim 5, wherein the first value is greater than the second and third values and the second value is greater than the third value.

7. The method of claim 1, wherein the classifying each column with a free space level comprises:
determining, for each column, a free space level classification from a heuristic lookup table based on the identified subarray length for the column and the elevation of the identified elevation for the column.

8. The method of claim 7, wherein a column classified with the highest free space level classification indicates free space between objects in the image.

9. The method of claim 7, wherein a column classified with the lowest free space level classification indicates no free space between objects in the image.

10. A system in a vehicle for identifying free space between objects, the system comprising one or more processors configured by programming instructions encoded in non-transitory computer readable media, the system configured to:
generate a voxel grid around the vehicle wherein the voxel grid has a plurality of columns;
trace lidar beams from a lidar system on the vehicle through the voxel grid;
identify a max subarray for each column in the voxel grid by:
assigning, for each column, a score to each voxel in the column by assigning a first value to a voxel if a first characteristic has been assigned to the voxel, assigning a second value to a voxel if a second characteristic has been assigned to the voxel, and assigning a third value to a voxel if a third characteristic has been assigned to the voxel; and
identifying, for each column, a sequence of contiguous elements in the column that maximizes a score for the column wherein the score for the column is equal to the sum of the scores assigned to the voxels in the identified sequence of contiguous elements;
identify, for each column, a subarray length for the identified sequence of contiguous elements for the column;
identify, for each column, an elevation of the lowest cell in the identified sequence of contiguous elements for the column;
classify each column according to a free space level based on the identified subarray length for the column and the identified elevation for the column; and
output the free space level for the classified columns in an image.

11. The system of claim 10, further configured to generate the voxel grid using lidar point cloud data, lidar position information relative to the vehicle, and vehicle position information.

12. The system of claim 10, further configured to trace lidar beams through the voxel grid by:
assigning the first characteristic to a voxel if one of the lidar beams travels through the voxel;
assigning the second characteristic to a voxel if none of the lidar beams travels through the voxel; and
assigning the third characteristic to a voxel if one of the lidar beams terminates at the voxel.

13. The system of claim 11, further configured to generate the voxel grid by shifting a pre-existing voxel grid based on the lidar point cloud data, the lidar position information and the vehicle position information.

14. The system of claim 12, wherein the first characteristic is clear, the second characteristic is unknown, and the third characteristic is occupied.

15. The system of claim 10, further configured to classify each column with a free space level by:
determining, for each column, a free space level from a heuristic lookup table based on the identified subarray length for the column and the elevation of the identified elevation for the column.

16. An autonomous vehicle, comprising:
a lidar system that generates lidar data; and
a mapping system configured to identify from the lidar data free space between objects, the mapping system comprising one or more processors configured by programming instructions encoded in non-transient computer readable media, the mapping system configured to:
generate a voxel grid around the vehicle wherein the voxel grid has a plurality of columns;
trace lidar beams from a lidar system through the voxel grid;
identify a max subarray for each column in the voxel grid by:
assigning, for each column, a score to each voxel in the column by assigning a first value to a voxel if a first characteristic has been assigned to the voxel, assigning a second value to a voxel if a second characteristic has been assigned to the voxel, and assigning a third value to a voxel if a third characteristic has been assigned to the voxel; and
identifying, for each column, a sequence of contiguous elements in the column that maximizes a score for the column wherein the score for the column is equal to the sum of the scores assigned to the voxels in the identified sequence of contiguous elements;
identify, for each column, a subarray length for the identified sequence of contiguous elements for the column;
identify, for each column, an elevation of the lowest cell in the identified sequence of contiguous elements for the column;
classify each column according to a free space level based on the identified subarray length for the column and the identified elevation for the column; and
output the free space level for the classified columns in an image.

17. The autonomous vehicle of claim 16, further configured to trace lidar beams through the voxel grid by:
assigning the first characteristic to a voxel if one of the lidar beams travels through the voxel:
assigning the second characteristic to a voxel if none of the lidar beams travels through the voxel; and
assigning the third characteristic to a voxel if one of the lidar beams terminates at the voxel.

18. The autonomous vehicle of claim 17, wherein the first characteristic is clear, the second characteristic is unknown, and the third characteristic is occupied.

19. The autonomous vehicle of claim 16, wherein the mapping system is further configured to classify each column with a free space level by:
determining, for each column, a free space level from a heuristic lookup table based on the identified subarray length for the column_and the elevation of the identified elevation for the column.

20. The autonomous vehicle of claim 16, wherein a column classified with the highest free space level classification indicates free space between objects in the image and a column classified with the lowest free space level classification indicates no free space between objects in the image.

* * * * *